United States Patent Office 3,543,134
Patented Nov. 24, 1970

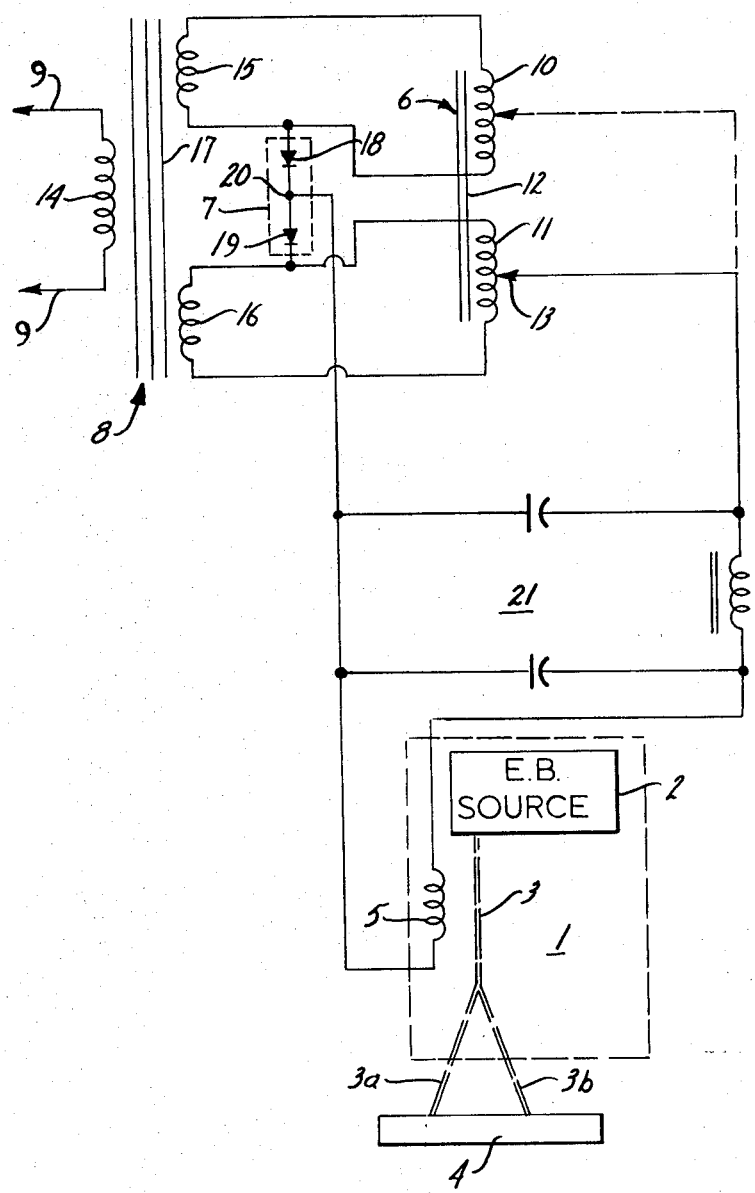

3,543,134
BI-DIRECTIONAL DIRECT CURRENT LOAD SUPPLY
Bernard J. Aldenhoff, Oconomowoc, Wis., assignor to A. O. Smith Corporation, Milwaukee, Wis., a corporation of New York
Filed Feb. 11, 1969, Ser. No. 798,374
Int. Cl. H02m 7/00
U.S. Cl. 321—8                                    7 Claims

ABSTRACT OF THE DISCLOSURE

The present disclosure includes a deflection coil for an electron beam welder. An autotransformer having a continuously adjustable brush assembly, such as a Variac, has its winding centrally separated to define a pair of electrically separate windings. An input transformer has a single primary and a pair of secondaries with each of the secondaries connected to one-half of the split autotransformer winding. A pair of series connected diodes connect the two windings at the separation with the coil interconnected to the common junction of the two diodes and the autotransformer brush assembly.

---

This invention relates to a bi-directional direct current load supply and particularly to such a supply including a transformer-rectifier unit and a variable dual element impedance for providing a continuously varying current control.

Direct current loads often require energization in either of two polarities or current directions. For example, the rotation of direct current motors can be controlled by controlling the direction of the current. Similarly, in electron beam welding, the electron beam may advantageously be deflected along the weld line through the use of a suitable direct current coil. Furthermore, the level of deflection is preferably adjustable. In this and similar applications, it is desired to have a single movable element controlling not only the direction but the amplitude of the load energization and in particular to provide an isolated source connected to a suitable alternating current incoming power supply.

The present invention is particularly directed to a relatively simple and inexpensive means for providing a bi-directional current supply to the load with the magnitude of both polarities being adjustable by the operation of a single control element.

Generally, in accordance with the present invention, a single physical winding having an adjustable tap means is provided with a separation at a given or selected intermediate point. The opposite halves of the winding are interconnected to an incoming alternating current power supply. The load is connected to the adjustable tap means and through a pair of uni-directional conducting means to corresponding sides of the windings. The uni-directional conducting means are polarized to conduct in the opposite directions with respect to the load terminal means. A continuously variable control of the current direction and magnitude is obtained by positioning of the tap means. Thus, with the tap at the common split portion of the two windings, the output will be zero. As the tap means moves to one side, the current will increase in a given direction through the load. Return of the tap means toward the separation results in a return of the current to zero. Corresponding movement of the tap means to the opposite side of the winding separation results in oppositely directed current through the load with a progressively increasing magnitude.

In accordance with a particularly novel aspect of the present invention, an autotransformer having a continuously adjustable brush assembly, such as a Variac, has the winding centrally separated to define a pair of electrically separate windings. The windings are energized from an isolated alternating current power source. For example, a transformer having a single primary and a pair of secondaries is provided with each of the secondaries connected to one-half of the split winding of the autotransformer. A pair of series connected diodes are connected between the two windings at the split or separation with the load interconnected to the common junction of the two diodes and the autotransformer brush assembly. The output current is then a half wave rectified alternating current which can be smoothed by the use well-known filter circuits.

The drawing furnished herewith illustrates the best mode presently contemplated by the inventor for carrying out his invention and clearly discloses the above advantages and features as well as others which will be readily understood from the following description.

The drawing is a schematic circuit diagram of the invention applied to an electron beam welding apparatus.

Referring to the drawing, the invention is shown applied to control an electron beam welding unit 1 having an electron beam source 2 for establishing an electron beam 3. The unit 1 includes a suitable support for a work member 4 which is aligned with the electron beam 3 for establishing a weld along a given weld line. A deflection coil 5 is mounted between the source 2 and the work 4 for deflecting and positioning of the weld electron beam 3 along the weld line; for example, as shown by the phantom line position 3a and 3b of beam 3. Certain welds may also be improved by continuous oscillation of the electron beam 3 from the normal lineal path to the opposite sides of the lineal path to the phantom line position. This can be accomplished by the energization of the coil 5 with a direct current with the movement to the left or to the right being controlled by the direction of current through the coil 5 and the amount of deflection being proportional to and controlled by the amplitude or magnitude of the current in the coil 5.

In accordance with the present invention, a specially constructed Variac or other autotransformer unit 6 and a rectifier unit 7 are interconnected to energize the deflection coil 5 with a controlled direction and current amplitude. Power is supplied to the Variac unit 6 from a transformer 8 which is interconnected to readily available 110 volt alternating current input lines 9.

More particularly, the illustrated autotransformer unit 6 may be any suitably rated Variac unit which, in accordance with the present invention, has its winding centrally separated to define a pair of separate windings 10 and 11 wound on the common core 12. The unit 6 thus provides the same physical arrangement, but two electrically separate windings. A single adjustable brush assembly, shown diagrammatically by the single adjustable tap 13, slidably engages the contact portion means of the windings 10 and 11 which are separately energized from the transformer 8. The illustrated transformer defines an isolated alternating current power source having a single primary winding 14 interconnected to the incoming alternating current input lines 9. A pair of separate secondary windings 15 and 16 are wound in common with the primary winding 14 on a common core 17.

The secondary winding 15 is connected directly across the upper half of the Variac winding identified as separate winding 10. The secondary winding 16 of transformer 8 is similarly connected directly across the second separate winding 11.

A pair of diodes 18 and 19 are connected in series between the separated portion of the windings 10 and 11. The common junction 20 of the diodes 18 and 19 define a first load terminal means interconnected to the one side of the electron beam deflection coil 5. The opposite side of the coil 5 is connected directly to the adjustable tap 13. The diodes 18 and 19 are oppositely polarized with respect to the common junction 20 and therefore with respect to the coil 5. Consequently, they are polarized to conduct oppositely directed current with respect to the coil 5.

A filter network 21 is connected across the tap 13 and the common junction 20 to provide an essentially constant direct current supply to the electron beam deflection coil 5 and thereby provide optimum positioning of the beam 3.

In the operation of the control supply, the positioning of the tap 13 at the point of separation results in a zero supply to the load. If the tap 13 is moved from the separation, for example, downwardly as shown in full line illustration in the drawing, a given directional direct current is supplied to the load 5 from winding 11 as follows: beginning with winding 11, and particularly the tap 13 to and through the coil 5 to the common junction 20 through the diode 19 to the top side of the winding 11.

Thus, the voltage appearing between the tap 13 and the top side of the winding 11 produces a direct current flow through coil 5. The magnitude of the voltage appearing between the top end and the brush or tap 13 is directly proportional to the position of the tap 13 from the top end. If the tap 13 is moved further downwardly, the current will increase. Conversely, if the tap 13 is moved upwardly, a lesser proportion of the supply voltage exists between or across the load and a correspondingly decreased current is supplied. The movement of tap 13 therefore controls the magnitude of the current in a continuous and infinitely variable manner as a result of the autotransformer construction.

During the portion of the cycle that the tap end of the winding 11 is positive, the diode 19 is biased to conduct and then establishes current as noted. During the opposite half cycle when the top end of the winding 11 is negative, relative to the brush 13, the diode 19 blocks current flow through the circuit path.

The filter 21 reduces the ripple associated with the half wave rectified current. Thus, in a power supply unit constructed for driving an electron beam coil, the transformer primary was connected to a 120 volt alternating current power supply. The secondaries were wound to establish a 60 volt alternating current voltage across each of the associated windings 10 and 11. The output circuit provided 44 volts at one ampere and with less than one percent ripple. The brush assembly, shown diagrammatically as tap 13, was motor driven through a suitable motor drive system, not shown, to produce the desired movement of the brush assembly and corresponding movement of the electron beam 3.

If the tap 13 is moved from the lower winding 11 upwardly past the separation point and onto the upper portion and winding 10, current will again be supplied to the coil 5. However, the current flow will now be in the opposite direction as follows: starting at the lower end of the winding 10 through the diode 18, common junction 20 to and upwardly through coil 5 to the tap 13. The voltage appearing between the tap 13 and the lower end of the winding 10 thus appears across the coil 5.

Applicant has found that the illustrated construction provides a relatively simple and inexpensive direct current power supply having means for reversing of the current supply with respect to the load in a smooth and continuous manner.

I claim:

1. In a direct current power supply for selectively supplying opposite polarities to a load, the improvement comprising:
   a support;
   a pair of coil assemblies mounted on said support, the coil assemblies having contact surfaces which are distributed continuously across the coil assembly;
   an adjustable tap connecting to a first load terminal and connecting said first terminal selectively to said contact surfaces on both coil assemblies; and
   a pair of unidirectional conducting means one each connected to each of said pair of coil assemblies and having a junction defining a second load terminal, a first of said conducting means being polarized to conduct in one direction relative to said second terminal and a second of said conducting means being polarized to conduct in the opposite direction relative to said second terminal.

2. The direct current power supply of claim 1, wherein said coil assemblies are defined by a single centrally split autotransformer winding and said adjustable tap includes a movable brush assembly slidably engaging said winding.

3. The direct current power supply of claim 1, wherein said uni-directional conducting means includes a pair of series connected solid state diodes with a common connection defining said second terminal.

4. The direct current power supply of claim 1, wherein said pair of coil assemblies are defined by a single centrally split autotransformer winding and said adjustable tap is a movable brush assembly slidably engaging the winding and said uni-directional conducting means being solid state diode elements.

5. The direct current power supply of claim 1, including an input transformer having a common primary and a pair of secondaries connected one each to each of said coil assemblies.

6. The direct current power supply of claim 1, wherein said pair of coil assemblies are formed by a central separation of a Variac winding and said adjustable tap is continuously adjustable along the winding, said pair of unidirectional conducting means are solid state diodes connected in series between said separation of said winding and have a common junction defining said second terminal means, and including an input transformer having a common primary and a pair of secondaries connected one each to each of the opposite halves of said Variac winding.

7. The power supply of claim 1 wherein said coil assemblies have corresponding first winding turns and corresponding subsequent winding turns, and said unidirectional conducting means being respectively connected to said corresponding first turns to establish a zero reference for said adjustable tap and greater potentials of opposite polarities in said corresponding subsequent turns away from said reference.

References Cited

UNITED STATES PATENTS 2,960,626  11/1960  Mulder _____ 219—131 XR

WILLIAM M. SHOOP, JR., Primary Examiner

U.S. Cl. X.R.

307—28; 317—7; 321—47; 219—121